Figure 1:
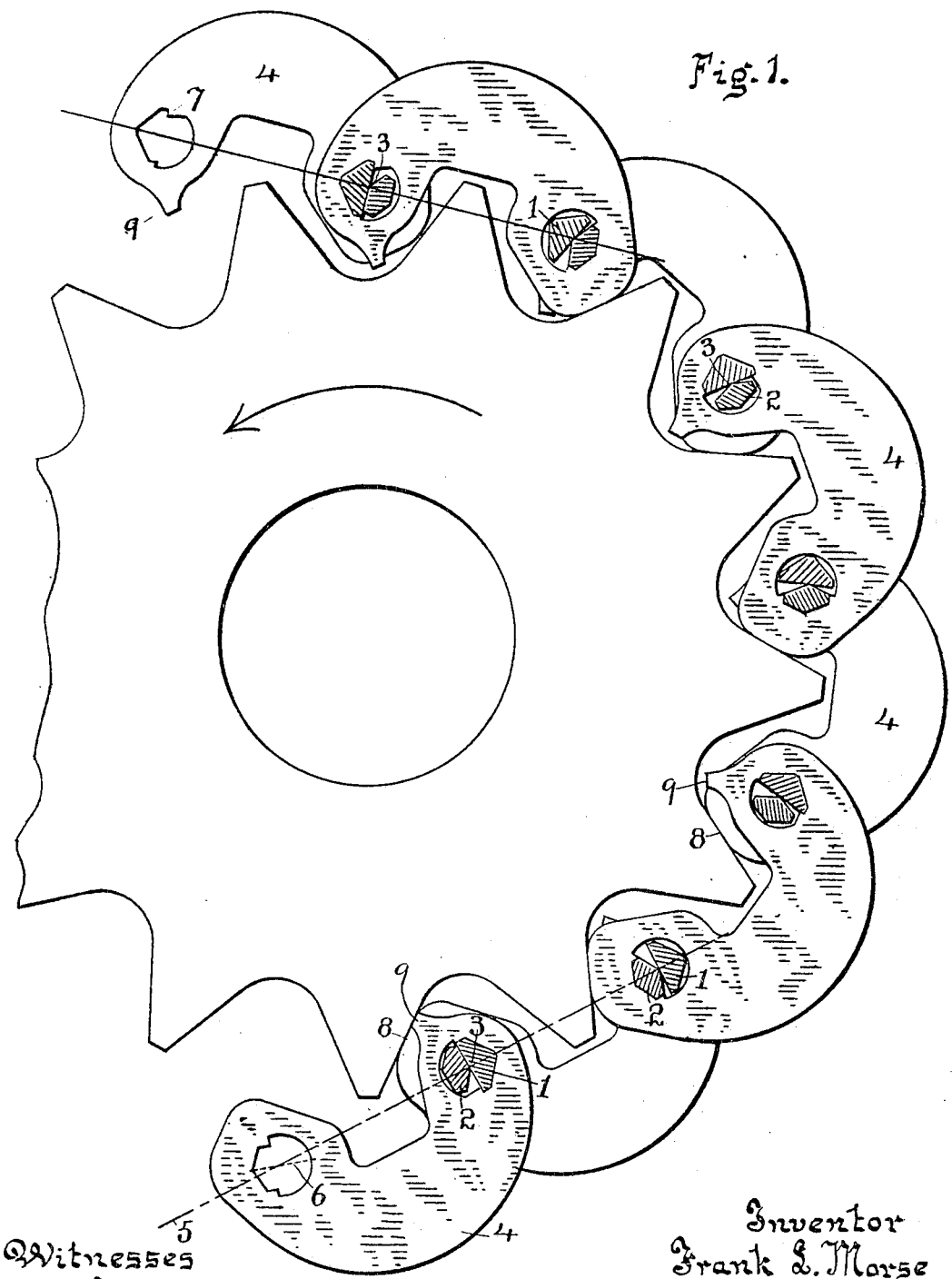

No. 799,073. PATENTED SEPT. 12, 1905.
F. L. MORSE.
DRIVE CHAIN.
APPLICATION FILED DEC. 24, 1901.

2 SHEETS—SHEET 1.

Witnesses
Otto Greenberg
Ethel L. Lawler

Inventor
Frank L. Morse
By
Townsend & Decker
Attorneys

No. 799,073. PATENTED SEPT. 12, 1905.
F. L. MORSE.
DRIVE CHAIN.
APPLICATION FILED DEC. 24, 1901.
2 SHEETS—SHEET 2.
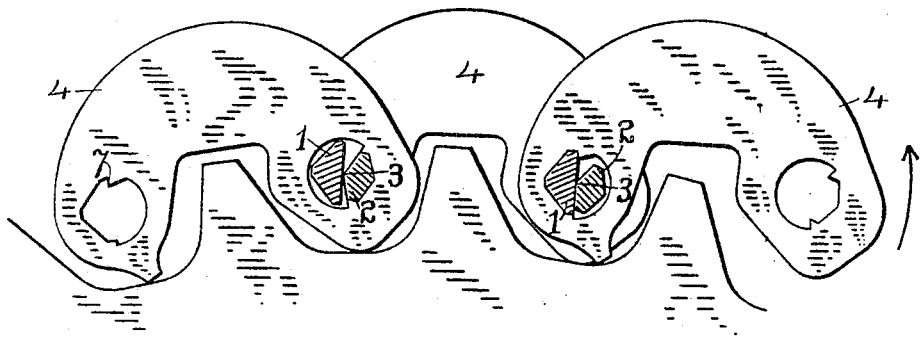
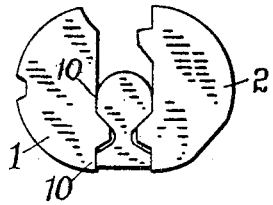
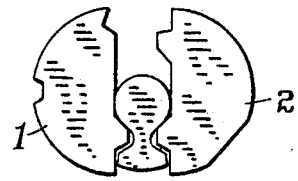
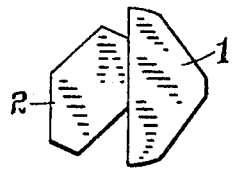
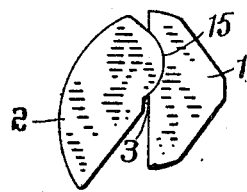
Witnesses:
Otto Greenberg
Ethel L. Lawler.
Inventor
Frank L. Morse.
By Townsend & Dunker
Attorneys

UNITED STATES PATENT OFFICE.

FRANK L. MORSE, OF TRUMANSBURG, NEW YORK, ASSIGNOR TO MORSE CHAIN COMPANY, OF TRUMANSBURG, NEW YORK.

DRIVE-CHAIN.

No. 799,073. Specification of Letters Patent. Patented Sept. 12, 1905.

Application filed December 24, 1901. Serial No. 87,066.

*To all whom it may concern:*

Be it known that I, FRANK L. MORSE, a citizen of the United States, and a resident of Trumansburg, in the county of Tompkins and State of New York, have invented certain new and useful Improvements in Drive-Chains, of which the following is a specification.

This invention relates to that class of power-chains in which the successive links are connected by a joint whose members have a rocking or rolling contact with one another, and is especially designed to improve the durability and smoothness of operation of joint where the pintle connecting the successive links is a two-part pintle, whose members are respectively herein termed for brevity the "rocker-pin" and the "seat-pin."

The main object of the present invention is to prevent vibrations in the tension or straight side of the chain and the consequent useless wear upon the surfaces which rock upon one another when the chain engages and leaves the sprocket.

A further object is to diminish the wear by increasing the extent of the bearing-surfaces in the rocking parts when the chain is drawn straight.

A further object of the invention is to prevent the tendency of the two members of the joint to slide transversely upon one another when the chain comes into engagement with the sprocket-wheel.

While the invention is useful not only in block-chains as well as in chains whose links are formed each of a number of plates, I shall hereinafter describe my invention as applied to the latter construction of chain.

Briefly stated, my invention consists of a rocker-joint chain whose engaging members at the joint are so formed and assembled with reference to one another and to the links that in the straight position of the chain there will be increased surfaces engaging in such manner as to obstruct or tend to prevent vibration.

As applied to a rocker-joint chain having a compound pintle the invention consists in forming the rocker-pintle with a surface extending from the rocking-point toward the edge of the pintle and engaging along said surfaces with a corresponding surface upon the seat-pin when the links are traveling in the line of pull between the sprockets.

My invention consists, further, in constructing both of the adjacent links in the chain so that they shall both be engaged by the sprocket-tooth where the tight or straight side of the chain engages the sprocket-wheel, so that the tendency of the link lying in the straight side of the chain and connected to the link just engaged by the sprocket-tooth to slide or slip at the bearing-surfaces of the joint may be obviated, as will be hereinafter more particularly described.

My invention consists, further, in details of construction and special combinations of parts, as hereinafter particularly described and claimed.

In the accompanying drawings, I have shown in Fig. 1 in skeleton a construction of chain embodying my invention in side elevation, that part of the chain shown being the portion which is traveling around the driving-sprocket and the first link of the straight portions of the chain connecting said driver-wheel with the driven sprocket-wheel. Fig. 2 shows three links of the chain detached. Fig. 3 illustrates the invention as carried out in connection with a modified form of rocker-joint, such as that shown in Fig. 4. Figs. 5 and 6 illustrate other modifications in the form of the wide or increased contact or bearing surfaces which act to hold the chain against vibration when drawn straight.

The particular form of joint shown is one wherein a two-part pintle is employed, one member of which at each joint is known in the art as "seat-pin" and the other as the "rocker." These two pins are of hardened steel and are fixed in their respective ends of the links of the chain, so as to be incapable of turning therein.

1 indicates the seat-pin portion of the compound pintle, which is fixed against rotation in the forward portion of each link 4 and has a straight or flat surface, preferably extending from edge to edge, and which pin passes freely through apertures in the rear end of the plates making up the adjoining link of the chain. Said pin may have its ends headed down upon the outer faces of the link to secure it against longitudinal displacement and may conform in shape to the opening in the link with which it turns in order to better secure it against turning in said link. The opposite member of the joint consists of the rocker-pin 2, fastened in a similar manner or in any other desired way in an opening in the rear end of each link, but passing freely through an aperture in the forward end of the link carrying the pin 1, with which it coöperates, to afford by its convex face at 3 a rocker bearing or joint between the two links in which said pins are respectively secured. The face of the pintle 2 is formed as shown to afford from the apex or center of its converging sides a broad bearing-surface engaging from the apex to the edge with the corresponding surface on the other member 1 of the joint in the straight portion of the chain. This is indicated at the joint between the first and second links at the bottom of Fig. 1, where a straight line 5 is drawn through the centers of three contiguous joints, and which line if extended to the left would take in the joints in the straight or tension side of the chain leading from a driven sprocket of larger diameter than the driver. As each link turns at its forward end in passing around on the periphery of the wheel the joint rocks until the parts assume the position indicated at the next joint of the series reading in the direction of the rotation. The relation of the bearing-surfaces indicated in the first joint whose parts are shown prevails through all the joints in the straight side of the chain where the pull exists, thus transferring the pressure from the rocking face to a broad bearing-surface well adapted to withstand the strain and by its conformation also resisting the tendency of the chain to vibrate and to thus rock upon the smaller bearing afforded by the parts where they are in rocking engagement. By this means wear of the chain at the rocker-bearings is greatly reduced and the liability of hardened bearings to break or crumble at the limited surfaces of contact afforded by a pure rolling contact, which is liable to occur under heavy tension, is practically eliminated. At the upper side of the driver the two end links are in the straight portion of the chain passing on the loose side of the chain to the driven sprocket. In this portion of the chain the same condition as to the extent of bearing-surface exists and with the same result as to prevention of vibration. The parts pass onto and off of the driven sprocket in the same way as indicated in the figure, those links which leave said driven sprocket on the lower or tension side of the chain assuming the position shown at the top of the figure and being identical in position and relation with the two terminal links at the driver end of the tension side.

To allow the chain taking a backward bend without interfering with the broad contact when drawn straight, the holes in the links which carry the rocker-pins 2 are punched with an increased longitudinal diameter on the dotted line 6, as seen in the lower link of Fig. 1, thus allowing the seat-pin to rock on the edge of the rocker-pin, as it would have to do if, for instance, the right-hand end of the right-hand link in the series of three shown in Fig. 2 were turned in the direction of the arrow. The shoulder formed at 7 in the holes punched in the forward ends of the links to hold the seat-pins is for the purpose of preventing or guarding against the twisting of said seat-pin relatively to the link when this back bend takes place. As the chain engages the sprocket on the straight or working side the tooth of the sprocket takes the rear side of each link on the surface 8, formed on the edges of the plates making up each link. When the tooth strikes this surface, there is a tendency on the part of the link in the straight portion of the chain and which is joined directly to the link struck to slip at the engaging surfaces of the joint across the face of the opposite member or rocker. To avoid this tendency and guard the parts of the joint against damage, the end of the adjoining link is so formed that it shall simultaneously engage the edge of the sprocket, for which purpose I provide the plates at their forward ends with the projections 9, which strike the sprocket-tooth at the instant the rear end of the adjoining link strikes. As the chain moves along with the sprocket the projection 9 turns free from the tooth, as shown by the next adjoining link on the right, thus allowing free action of the joint in changing from the position shown at the first joint to that indicated by the next and succeeding joints.

It will be seen that the rocker portion 2 of the pintle is formed on its rear side to the same shape as on its front or rocker part. By this means it is obvious that the work of assembling parts will be facilitated, since the rocker will be in proper position no matter which side is placed opposite the seat-pin portion of the joint.

Fig. 3 illustrates the application of the invention to that form of rocker-joint wherein the two parts 1 and 2 of the pintle instead of rocking upon one another rock upon an intermediate piece or plate 10, which as constructed previously to my present invention was of the form shown in Fig. 4, but which as modified according to my present invention is provided with the bearing-surfaces, as indicated at 10, thus giving a wide extended bearing in place of the limited rocker-bearing afforded by the form shown in Fig. 4 for those joints which are in the tension side of the chain and securing for this particular construction of rocker-joint the advantages attained in the form shown in Figs. 1 and 2. Other modifications may obviously be employed to secure the same practical result—to wit, a wide bearing-surface either curved or flat on the faces of the rocker-joint engaged when the chain is pulled straight, as it is when under tension, at the same time leaving the parts free on entering upon the sprocket-wheel to turn one upon the other and assume the true rocker relation.

The wide contact-surfaces on the rocker-pin shown in Figs. 1 and 2 may be straight from below the center of the pin, as shown in Fig. 5, the rocker-point being then also off of the center of said seat-pin. This widens out the bearing or contact and provides therefor a still better safeguard against vibration. It is not necessary that the surfaces or contacts which engage in the straight portion of the chain should be perfectly flat. Thus, for instance, the rocker-pin and seat-pin may be formed as shown at Fig. 6, so that when the chain is drawn straight pressure is taken up by the wide curved surfaces, (indicated at 15.) This transfers the pressure from the rocking-point to a wide bearing, which in addition by reason of its shape affords a frictional resistance to vibration. In passing onto and off of the sprocket the two members roll or rock upon one another at the point 3, as already described.

What I claim as my invention is—

1. A rocker-joint chain provided with parts adapted to turn one upon another and having a greater area of surface in contact when the chain is pulled straight than when curved.

2. In a rocker-joint chain, a two-part pintle or bearing whose members are adapted to rock upon one another but which have a bearing by an extended flat surface in the straight side of the chain as and for the purpose described.

3. In a rocker-joint chain, the combination substantially as described of a seat-pin and a rocker-pin or pintle engaging at or about their center by a rocking bearing and having an increased contact-surface or bearing when the chain is pulled straight.

4. In a rocker-joint chain, a pintle consisting of a hardened-steel pin whose bearing sides and side engaged or locked with the link are symmetrical, as and for the purpose described.

5. In a rocker-joint chain, a rocker-pintle consisting of a section of rod which is symmetrical as to its bearing and locking surfaces, as and for the purposes described.

6. In a rocker-joint chain, a two-part pintle or joint consisting of a seat-pin and a rolling pin both of which are formed and connected to the links of the chain so as to be incapable of rotation therein but which have engaging surfaces adapted to rock upon one another as the chain turns on the sprocket but to engage by a flat or curved bearing when the chain is pulled straight.

7. A rocker-joint chain having a compound pintle whose parts are adapted to rock one upon another, said parts being provided with contact-surfaces which engage each other over a greater area when the chain is pulled straight than when curved.

8. In a rocker-joint chain, chain-links adapted both to be simultaneously engaged by the tooth of the sprocket at their ends which are joined together so as to obviate the tendency of the members of the joint to slide or slip upon one another.

9. In a rocker-joint chain having a seat-pin and rocker-pin as described, a chain-link having a projection adapted to engage the sprocket at the instant that said sprocket engages the rear end of the adjacent link.

10. A rocker-joint chain having links formed of a plurality of plates joined by two-part pintles comprising a seat-pin and rocker, the seat-pin being of an angular cross-section and secured in correspondingly-shaped holes in said plates.

Signed at Trumansburg, in the county of Tompkins and State of New York, this 10th day of December, A. D. 1901.

FRANK L. MORSE.

Witnesses:
JULIA L. SEELYE,
L. Z. BAUTA.